Aug. 26, 1930. W. A. PHILLIPS 1,774,154
ICE CREAM DISHER
Filed Feb. 9, 1929
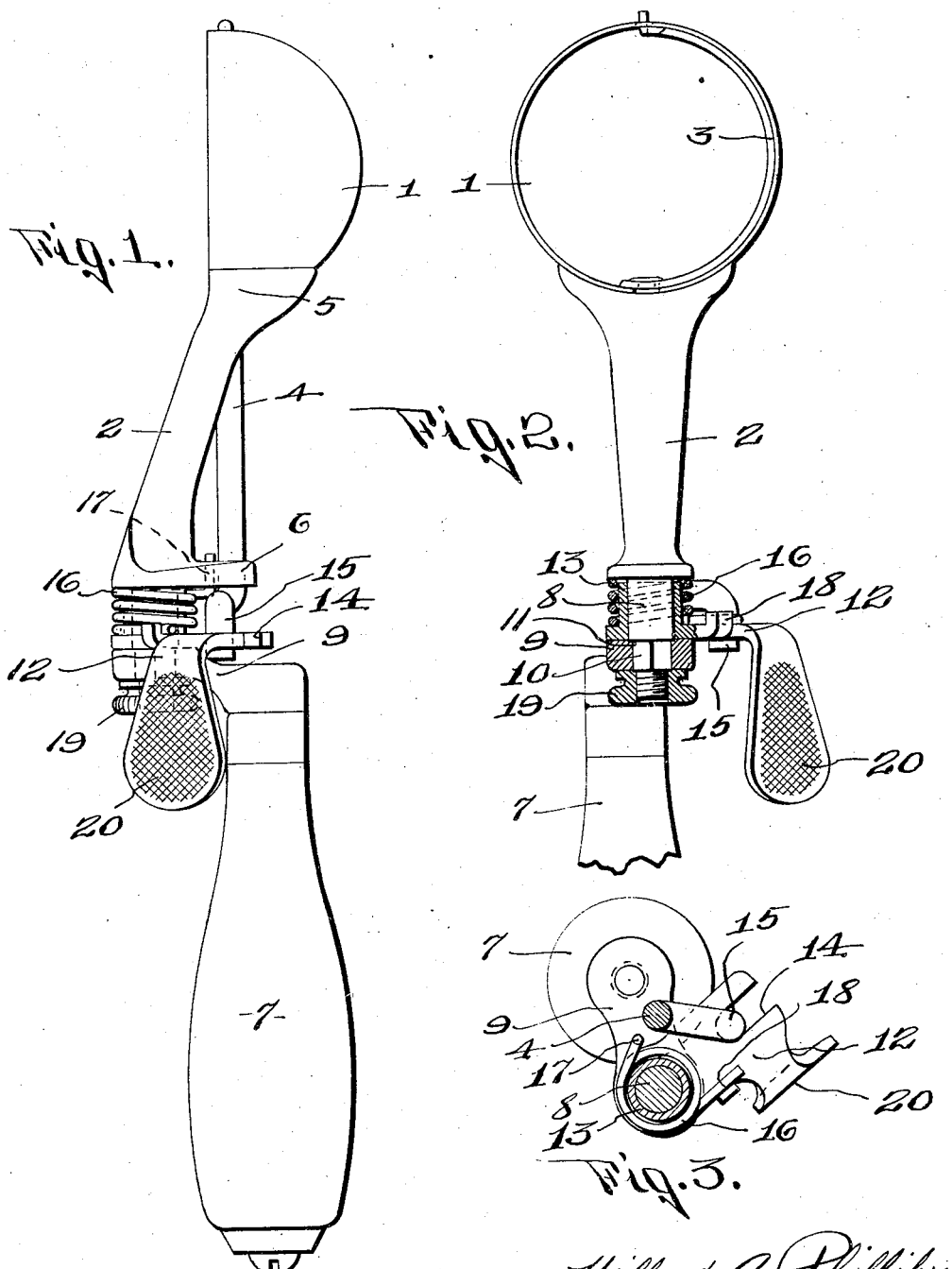
Willard A. Phillips
INVENTOR
BY Frederic G. Bodell
ATTORNEY Patented Aug. 26, 1930

1,774,154

UNITED STATES PATENT OFFICE

WILLARD A. PHILLIPS, OF EAST SYRACUSE, NEW YORK, ASSIGNOR TO T. N. BENEDICT MFG. CO., OF EAST SYRACUSE, NEW YORK, A CORPORATION OF NEW YORK

ICE-CREAM DISHER

Application filed February 9, 1929. Serial No. 338,858.

This invention relates to ice cream dishers and has for its object an ice cream disher which is particularly simple and economical in construction and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1 is a side elevation of a disher embodying my invention.

Figure 2 is a fragmentary elevation, partly in section, looking to the right in Figure 1.

Figure 3 is a detail view of the thumb lever and contiguous parts.

This ice cream disher comprises, generally, the usual bowl, a shank extending from the bowl, a scraper movable in the bowl, an operating shaft therefor extending along the shank substantially radial with the bowl, a handle also arranged substantially radial with the bowl and nearly in line with the shaft and with its axis parallel to the axis of the shaft and offset from the shank and a thumb lever pivoted on the shank on an axis offset from and parallel to the axis of the shaft whereby the thumb lever moves toward and from the handle, the handle having a laterally extending arm connected to the shank at a point concentric with the axis of the lever.

1 designates the bowl and 2 the shank which is inclined relatively to the bowl out of a line radial with the bowl, the incline being toward the plane of the open side of the bowl so that the shank extends beyond the plane of the open side of the bowl.

3 is the scraper rotatably mounted in the bowl. 4 is the operating shaft for the scraper journalled at 5 and 6 in the shank.

7 is the handle arranged nearly in axial alinement with the shaft 4 and hence extending radially relatively to the bowl. The shank is provided with a stud 8 at its end toward the handle and the handle has a laterally extending arm 9 mounted upon the stud and spaced apart from the shank 2, the stud being provided with a noncircular or square end portion 10 and the arm 9 having a correspondingly shaped hole to fit the noncircular or square portion 10, the arm abutting against a shoulder 11 at the base of the noncircular or square portion 10.

12 is a thumb lever having a hub 13 mounted on the stud 8, the thumb lever itself being located adjacent the arm 9.

Connections are provided between the thumb lever and the shaft 4 to transmit and multiply the motion of the lever to the shaft. As here illustrated, the thumb lever is provided with a radial slot 14 which receives an eccentric or crank pin 15 on the rear end of the shaft 4. A torsion spring 16 is coiled about the hub of the lever and is anchored at one end at 17 to the shank 2 and its other end thrusts at 18 against the thumb lever.

The handle or arm 9 is secured to the stud by a nut 19 threading on the end of the stud against the outer side of the arm 9.

The lever has a thumb piece or pinch handle 20 extending at an angle thereto and overhanging the handle 7.

In operation, the operator takes hold of the handle 7 with his thumb on the thumb piece 20 and scoops the bowl into the ice cream in the usual manner, filling the bowl. He then pinches the thumb lever toward the handle against the action of a spring, the movement of the thumb lever being transferred to the shaft 4 of the scraper to discharge the ice cream or other matter from the bowl.

Owing to the relative arrangement of the shank 2, shaft 4 and handle 7, the device is conveniently handled and is particularly well balanced in the hands of the operator both for dishing into the ice cream to fill the bowl and in operating the thumb lever to discharge the contents from the bowl.

What I claim is:

1. An ice cream disher comprising a bowl, a shank projecting from one side of the bowl, a scraper mounted in the bowl and an operating shaft therefor extending along the shank and arranged substantially radial with the bowl, a handle arranged substantially radial with the bowl and nearly in line with the shaft, a thumb lever mounted on the shank eccentric to the shaft and movable toward and from the handle, motion transmitting and multiplying connections between the thumb lever and the shaft, the handle having a laterally extending arm opposed to the end of the shank and spaced apart therefrom, means for rigidly supporting the arm on the shank, the thumb lever being located between the arm and the opposing end of the shank.

2. An ice cream disher comprising a bowl, a shank extending from one side of the bowl, a scraper mounted in the bowl, an operating shaft therefor extending lengthwise of the shank and substantially radial with the bowl, a handle arranged substantially radial with the bowl, and nearly in line with the shaft, the shank having a stud on the end thereof toward the handle, the stud extending substantially parallel to the axis of the shaft and offset from the handle and the shaft, a thumb lever mounted on the stud and motion transmitting and multiplying connections between the thumb lever and the shaft, the handle having a laterally extending arm opposed to the end of the shank and fixed on the stud.

3. An ice cream disher comprising a bowl, a shank extending from one side of the bowl, a scraper mounted in the bowl, an operating shaft therefor extending lengthwise of the shank and substantially radial with the bowl, a handle arranged substantially radial with the bowl, and nearly in line with the shaft, the shank having a stud on the end thereof toward the handle, the stud extending substantially parallel to the axis of the shaft and offset from the handle and the shaft, a thumb lever having a hub mounted on the stud, motion transmitting and multiplying connections between the thumb lever and the shaft, the handle having a laterally extending arm mounted on the stud, and a nut threading on the end of the stud against the arm.

In testimony whereof, I have hereunto signed my name, at East Syracuse, in the county of Onondaga and State of New York, this 31st day of January, 1929.

WILLARD A. PHILLIPS.